Aug. 1, 1950 G. J. LEHMANN 2,516,887
ULTRA HIGH FREQUENCY RADIO RECEIVER
Filed Oct. 30, 1943
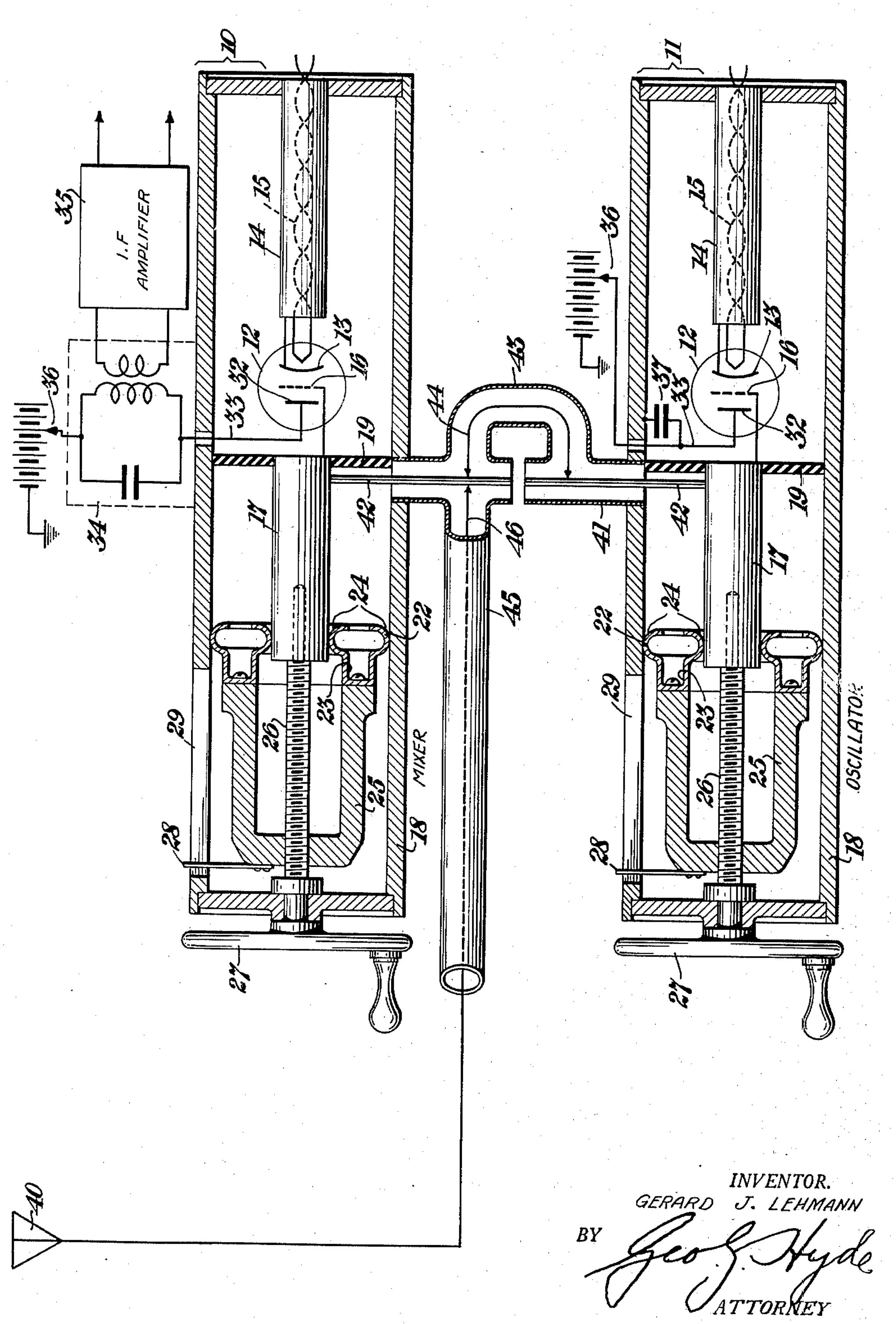
INVENTOR.
GERARD J. LEHMANN
BY Geo. J. Hyde
ATTORNEY Patented Aug. 1, 1950

2,516,887

UNITED STATES PATENT OFFICE 2,516,887

ULTRA HIGH FREQUENCY RADIO RECEIVER

Gerard J. Lehmann, New York, N. Y., assignor to International Standard Electric Corporation, New York, N. Y., a corporation of Delaware Application October 30, 1943, Serial No. 508,289

5 Claims. (Cl. 250—20)

This invention relates to ultra high frequency radio receivers and amplifiers and especially to superheterodyne receivers for waves having a frequency too high for direct amplification.

In the highest frequency range used for radio communication it has not yet been found practical to provide amplifiers acting directly upon the received wave. The first tube of the receiver is therefore a frequency converter of the superheterodyne type which reduces the frequency to a value which permits amplification by standard methods.

However, the tubes which are effective at these high frequencies have very small dimensions, resulting in a necessarily low value for the conversion curve. Moreover, the signals are generally transmitted on a very wide frequency band, therefore the grid circuit impedance must be very low. Consequently the gain in the first tube and the level of entry into the intermediate frequency amplifier is correspondingly low.

This condition gives excessive prominence to the noise developed in the first tube circuits, and particularly the space current hiss in the plate circuit of the tube, a factor that is not of particularly important consideration at lower frequencies because of the much higher grid circuit impedances that can be used. Under these conditions the noises originating in the first detector tube and the intermediate frequency circuits acquire a rather important value and interfere with the sensitivity of the receiver.

Consequently it is important to impress the maximum signal voltage on the grid of the first detector-mixer tube of the superheterodyne. Preliminary radio frequency stages of the type used at lower wavelengths are not available, and attempts to increase the signal value by input inductance tuners are subject to serious mechanical and electrical disadvantages. An important object of the invention is to provide an arrangement that may be used with ultra high frequency waves that at present cannot be directly amplified, which will have the effect of increasing the input signal strength to the superheterodyne detector-mixer, and thereby decreasing the relative importance of the noises originating in the intermediate frequency circuits, a result that increases materially the sensitivity of the receiver. This is in general accomplished by providing a regenerative action in the detector-mixer tube by means which is suitable for use in the indicated frequency range.

The preferred arrangement embodying the invention includes the use of an ultra high frequency tube unit capable of oscillation at said frequencies, the high frequency circuit of the tube including an adjustable reactance or other element which can be regulated to maintain the tube unit in the neighborhood of but below the point of oscillation, arranged so that under these conditions there will be a regenerative feedback between the circuits of the two electrodes which will produce oscillation when the reactance is given an appropriate value. An oscillator is coupled to this tube unit to produce the usual heterodyning of the signal and oscillator frequencies, the combination wave being fed to an intermediate frequency amplifier and the succeeding sections of the usual superheterodyne circuit.

A feature of the invention is the provision of a novel type of tube unit adapted for operation in the indicated frequency range. A further feature is the provision of such a unit which is adapted for use both as the oscillator and the mixer.

Other features, including improved circuit arrangements as well as tube unit construction features and coupling, will appear from the following description considered in connection with the accompanying drawing, which is a partly schematic showing of a circuit embodying the invention, with the tube units shown in longitudinal central section. The disclosed arrangement includes a mixer unit 10 and an oscillator unit 11. Since the units are mechanically the same, the mixer will be described, similar parts in the oscillator being indicated by the same numerals.

The tube 12 may be an "acorn" triode of the 955 type. The cathode 13 is connected to a cylindrical conductor 14 through which the filament leads 15 are coaxially passed. The grid 16 is connected to a cylindrical grid resonator 17. The cathode conductor 14 and resonator 17 are concentric with and mounted in a cylindrical thick metal casing 18, closed at both ends, which provides a resonator chamber surrounding each of these elements, as well as a support for said elements, the conductor 14 being seated in an end of cylinder 18 while the grid end of resonator 17 may be supported by a disk 19 of suitable insulating material such as polystyrene, engaging the tube end of said resonator and the casing 18.

A suitable tuning arrangement for the grid circuit is advantageously provided, including means for varying the dimensions of the chamber surrounding the grid resonator 17. The disclosed arrangement for this purpose includes a toroidal metal member 22 spanning the space between resonator 17 and the cylinder 18, slidably engaging these elements for longitudinal adjustment. The member 22 as shown is constructed from sheet metal having inner and outer walls 23 each provided with a lateral bead 24 engaging circumferentially the adjacent portion of resonator 17 or cylinder 18, the inturned margins of the beads being suitably spaced. Member 22 is mounted on a suitable support such as the sleeve 25 with a closed outer end threaded on an adjusting screw 26 having a bearing support in the end of resonator 17 at one end and at the other end extending through a bearing in the end of cylinder 18. Suitable means such as wheel 27 mounted on the outer end of screw 26 is provided for accurate longitudinal adjustment of the member 22. An arm 28 mounted on support 25 and extending through a slot 29 in cylinder 18 prevents the support 25 and member 22 from rotating during adjustment, and also provides a convenient external index or index actuator which may move with respect to a suitable graduated scale (not shown), to indicate the wavelength to which the tube unit is tuned.

The anode 32 is connected through lead 33, which passes through a suitable opening in the wall of cylinder 18, to the input circuit 34 of the intermediate frequency amplifier 35 and thence to a grounded source of adjustable voltage 36. In the oscillator 11 the anode lead 33 is coupled to cylinder 18 through condenser 37, and lead 33 of course extends directly to the adjustable voltage source 36 for that unit.

A suitable coupling between the units and a connection to the antenna 40 are provided. In the illustrated arrangement aligned lengths of coaxial line 41 extend into cylinders 18 with their outer ends slightly spaced and their inner conductors 42 connected to the grid resonators 17. The conductors 41 are coupled by a coaxial line 43 having an inner conductor 44 whose ends are adjustably connected to the conductors 42 to obtain the proper coupling. The antenna 40 is connected to line 41 from mixer 10 through coaxial line 45, whose inner conductor 46 is likewise adjustable along the inner conductor 42 and may advantageously be connected to inner conductor 44 for simultaneous adjustment.

In constructing the units the dimensions of the resonant chamber surrounding the cathode resonator cylinder 14 are regulated in accordance with the range of wavelengths to be received, which may be readily accomplished within reasonable limits by varying the length of tube 14. The resonant chamber has the effect of a reactance, and the value is not critical, each value being satisfactory throughout a relatively wide band of frequencies. The oscillating circuit is of the grounded plate type in which the oscillations take place between the grid and cathode circuits, the point of oscillation being determined by the potential on the anode. In the illustrated arrangement this potential is adjusted in the oscillator to provide continuous oscillation, and in the mixer 10 is maintained just below the point of oscillation, where effective feedback is obtained.

One embodiment of the specific arrangement that has been described has been found to be effective in the range of 545 to 600 megacycles, corresponding to wave-lengths of 50 to 55 centimeters. Its adjustment and stability are similar to those of receivers for longer waves. By proper design of the tube units the invention is applicable to substantially shorter waves, and of course may be used effectively for wavelengths up to the length at which direct radio frequency amplification is practical. At present the upper frequency limit, above which direct radio frequency amplification is ineffective, is about 600 to 800 megacycles.

While a preferred embodiment has been shown and described, the specific disclosure thereof has been made primarily for purposes of illustration and not limitation, since various features may be modified within the scope of the invention as set forth in the claims. The disclosed arrangement however provides a compact unit adapted for convenient and efficient construction, and an arrangement whereby two tube units may be rigidly connected by concentric lines to constitute superheterodyne input apparatus, incorporating both the oscillator and the mixer, the whole assembly being self-contained and not subject to damage or loss of adjustment. The means for adjusting both the wavelength and the feedback are very simple and positive in action, and the unit is efficient over a wide band of wavelengths.

What is claimed is:

1. A superheterodyne amplifier for ultra-high frequency waves comprising, in combination, a low-noise mixer unit and an oscillator unit, each comprising a grid resonator and a cathode resonator, connected respectively to the grid and cathode of an electron discharge device having also an anode, said mixer and oscillator being of substantially similar construction, arranged adjacent to one another, each of said resonators comprising an outer wall in the form of a cylindrical metal casing surrounding a tuning core, said grids and cathodes coupled to a respective core, a coaxial line circuit for coupling said grid resonators, said grid resonators being in wave-transmitting relationship to said cathode resonators, with means for varying the resonant wavelength of said grid resonator.

2. A superheterodyne amplifier for ultra-high frequency waves as defined in claim 1, in which said wave-transmitting relationship comprises feedback between said grid resonator and said cathode resonator.

3. An arrangement according to claim 1, wherein said coaxial line circuit comprises two coaxial stubs each having an inner and outer conductor, said inner conductors coupled at one end to a respective tuning core and said outer conductors coupled to a respective casing, and a coaxial line section for adjustably coupling said stubs.

4. A superheterodyne amplifier for ultra-high frequency waves comprising a mixing unit and an oscillator unit feeding said mixer unit, said mixer unit comprising an electron discharge device having cathode, grid and plate electrodes, a coaxial line grid resonator and cathode resonator each comprising inner and outer conductors, means for connecting one end of the inner conductor of said grid and cathode resonator to a grid and cathode electrode respectively, means for short circuiting said resonators at the other end, said grid resonator being supported at said one end by a suitable insulating disk mounted between the inner and outer conductor, and being adjustably supported at the other end by a toroidal hollow metal member spanning the space between the inner and outer conductor of said grid resonator.

5. A superheterodyne amplifier unit as defined in claim 4, in which said toroidal metal member is slidably adjusted by means of a support communicating with a suitable screw device controlled from the exterior of said resonator, and means including an arm mounted on said support and extending through a slot in said cylinder, said means preventing said member from rotating during adjustment and also providing convenient external index means adapted to indicate the wavelength to which said unit is tuned.

GERARD J. LEHMANN.

REFERENCES CITED

The following references are of record in the file of this patent:

UNITED STATES PATENTS

| Number | Name | Date |
|---|---|---|
| 2,062,004 | Hansell | Nov. 24, 1936 |
| 2,067,536 | Klotz | Jan. 12, 1937 |
| 2,088,722 | Potter | Aug. 3, 1937 |
| 2,120,518 | Dreyer | June 14, 1938 |
| 2,227,604 | Smith | Jan. 7, 1941 |
| 2,236,004 | MacLean | Mar. 25, 1941 |
| 2,253,589 | Southworth | Aug. 26, 1941 |
| 2,262,979 | Vilkomerson | Nov. 18, 1941 |
| 2,272,062 | George | Feb. 3, 1942 |
| 2,277,638 | George | Mar. 24, 1942 |
| 2,293,151 | Linder | Aug. 18, 1942 |
| 2,382,954 | Beaudoin | Aug. 21, 1945 |